United States Patent [19]

Masreliez

[11] Patent Number: 5,173,781

[45] Date of Patent: Dec. 22, 1992

[54] OVERHEAD TELEVISION

[75] Inventor: C. Johan Masreliez, Redmond, Wash.

[73] Assignee: Analytic Technology, Redmond, Wash.

[21] Appl. No.: 655,673

[22] Filed: Feb. 14, 1991

[51] Int. Cl.⁵ ............................................. H04N 5/645
[52] U.S. Cl. .................................... 358/248; 358/250; 358/254; 358/231; 358/249; 248/309.1; 312/249.1; 353/71; 353/72
[58] Field of Search ............... 358/254, 248, 231, 236, 358/237, 238, 249, 250; 248/309.1; 312/251; 353/72

[56] References Cited

U.S. PATENT DOCUMENTS 2,470,912  5/1949  Best et al. ............................ 358/250
4,939,582  7/1990  Holdredge et al. .................. 358/254

Primary Examiner—Edward L. Coles, Sr.
Assistant Examiner—Chi V. Lam
Attorney, Agent, or Firm—Seed and Berry

[57] ABSTRACT

A bedside television designed to permit a patient, or the like, to view the television while comfortably lying in bed without bending his neck. The bedside television device includes a television mounted substantially above the head of the patient and having a screen on which an image is displayed, the screen facing substantially upwardly, a pair of orthogonally disposed mirrors for reflecting the image displayed on the screen so as to create a virtual image of the image at a position above and forward of the patient at a distance that is further from the patient than the screen, and a mounting mechanism for mounting the television and the mirrors to a wall. The television and the mirrors are pivotally disposed in the mounting mechanism so as to be rotatable from a closed, non-viewing position to an open, viewing position. The mounting mechanism includes a support bracket secured to the wall and extending outwardly therefrom, a cradle pivotally secured to the bracket and supporting the television in such a manner that the television is pivotal from the viewing position to the non-viewing position by rotating the cradle, and a cabinet pivotally secured to the cradle and having the mirrors disposed on inside, orthogonal surfaces thereof such that the mirrors are rotatable from the viewing position to the non-viewing position by rotating the cabinet.

8 Claims, 2 Drawing Sheets

OVERHEAD TELEVISION

FIELD OF THE INVENTION

This invention relates to a television device, and more particularly, to a television device which allows a person to comfortably watch the television while lying in bed.

BACKGROUND OF THE INVENTION

The concept of reflecting an image produced by a television screen from two reflective surfaces is known in the art. For instance, U.S. Pat. Nos. 4,202,015; 2,509,508; 4,386,372; 3,804,504; 3,944,734; 2,438,022; and 3,036,154 disclose projection systems in which an image is reflected from at least one reflective surface. However, the problem with these systems is that they cannot be conveniently utilized as bedside television systems allowing a patient to comfortably view the screen while lying in bed. Rather, these systems are relatively large and cumbersome and the viewing screens are generally disposed in a position which would require the patient to bend his or her neck in order to view the screen. For example, U.S. Pat. No. 3,944,734, noted above, discloses a video projection system including a cabinet designed to be placed on the floor for viewing by a person sitting in an upright position, as illustrated therein.

SUMMARY OF THE INVENTION

The present invention is directed to a bedside television designed to permit a patient, or the like, to view the television while comfortably lying in bed without bending his neck. The bedside television system comprises a television mounted substantially above the head of the patient and having an upwardly facing screen on which an image is displayed, and a pair of orthogonally disposed mirrors for reflecting the image displayed on the scream so as to create a vertual image of the image of a position above and forward of the patient at a distance that is further from the patient than the screen, and a mounting mechanism for mounting the television and the mirrors to a wall. The television and the mirrors are pivotally disposed in the mounting mechanism so as to be rotatable from a non-viewing position to a viewing position The mounting mechanism includes a support bracket secured to the wall and extending outwardly therefrom, a cradle pivotally secured to the bracket and supporting the television in such a manner that the television is pivotal from the viewing position to the non-viewing position by rotating the cradle, and a cabinet pivotably secured to the cradle and having the mirrors disposed on inside orthogonal surfaces thereof such that the mirrors are rotatable from the viewing position to the non-viewing position by rotating the cabinet According to the preferred embodiment of the invention, the television is disposed such that the screen faces substantially upwardly and the mirrors are positioned to reflect the image from the screen downwardly toward the patient The combined reflection of the image on the mirrors is equivalent to viewing a virtual image of the screen at a position symmetrically located from the screen on the opposite side of the corner defined by the orthogonally disposed mirrors.

DETAILED DESCRIPTION OF THE PREFERRED EMBODIMENT

Figure 1:
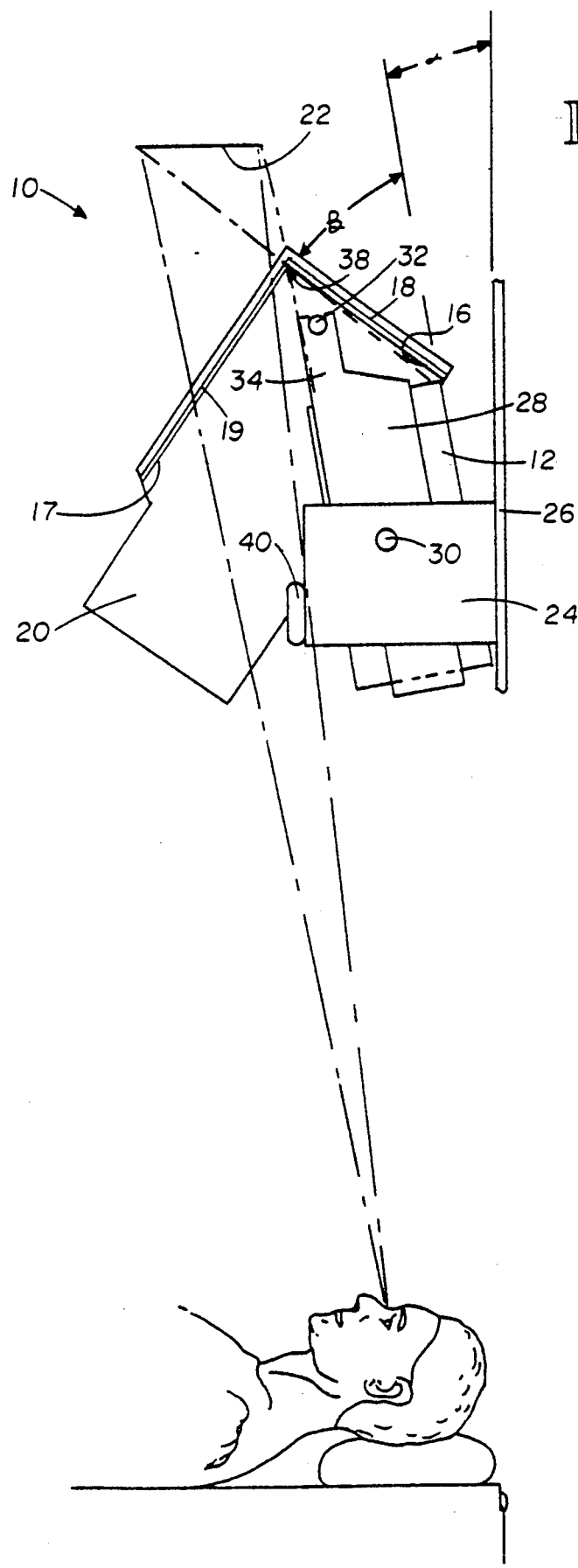
FIG. 1 is a side, elevational view of the bedside television system in an open, viewing position, according to the present invention.
Figure 2:
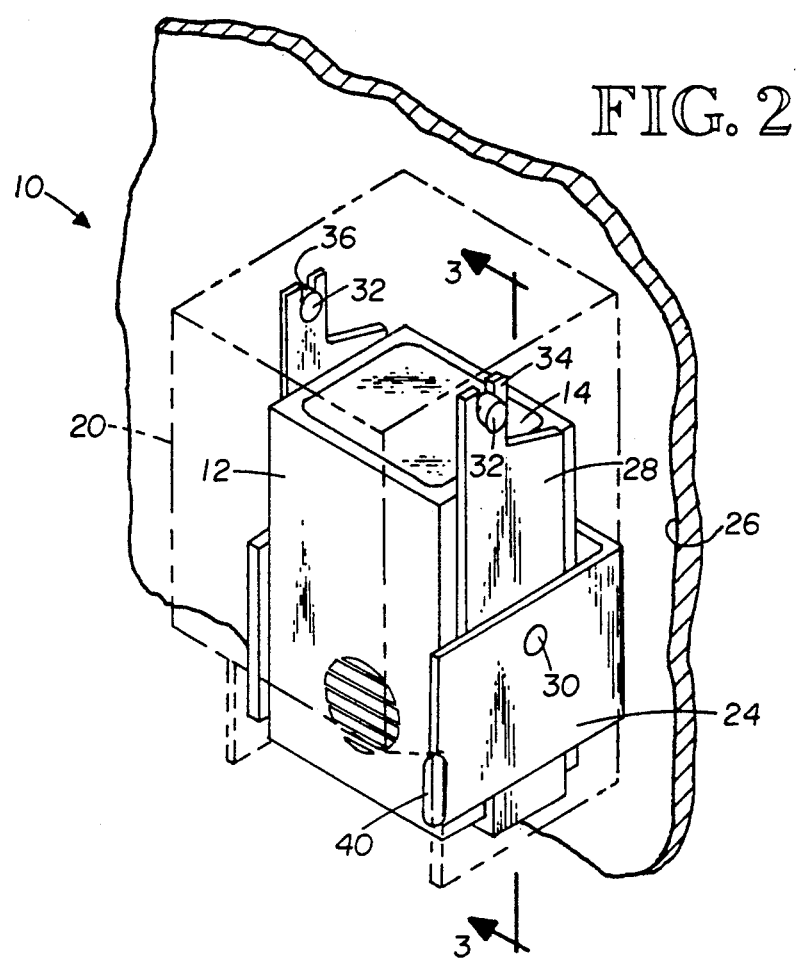
FIG. 2 is an isometric view of the bedside television system in a closed, non-viewing position.

As illustrated in FIGS. 1 and 2, the overhead television device 10 includes a television 12 having a screen 14 facing substantially upwardly and a pair of mirrors 16, 17 disposed orthogonally with respect to one another on the interior top 18, and front 19 surfaces, respectively, of a cabinet 20. The image projected from the screen 14 is reflected from each of the mirrors. The combined reflection of the image by the mirrors results in a virtual image 22 located at a position that is forward of and further from the patient than the physical location of the television screen 14. Therefore, the patient, lying in bed, can comfortably watch the television without bending his neck, as is necessary when watching a conventional bedside television.

Figure 3:
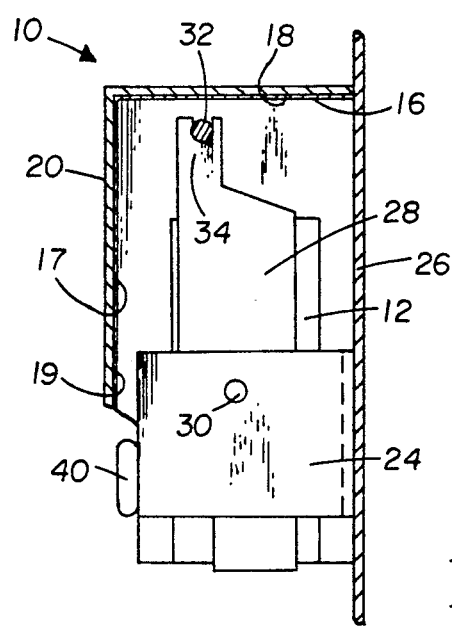
FIG. 3 is a side, elevational view of the bedside television system in the closed, non-viewing position.

The television device 10 further includes a mounting arrangement which permits the television system to be rotated from an open viewing position, as illustrated in FIG. 1, to a closed, non-viewing position, as illustrated in FIGS. 2 and 3. The mounting arrangement consists of a U-shaped bracket 24 secured to a wall 26 and a U-shaped cradle 28 pivotably supported by the bracket 20 at pivot 30. The television 12 is fixedly secured to the cradle 28 with the screen 14 facing upwardly such that rotation of the cradle causes a corresponding rotation of the television. Additionally, the cabinet 20 is pivotably secured to the top portion of the cradle such that the cabinet, with the mirrors 16, 17 disposed thereon, can be rotated so to provide the proper orientation of the mirrors with respect to the television screen 14, as described further below.

More specifically, as illustrated in FIG. 2, the cabinet 20 is substantially rectangular in shape and includes a pair of pivot rods 32 extending inwardly from opposite sides thereof The cradle includes a pair of support arms 34 extending upwardly therefrom which have a U-shaped groove 36 provided therein for receiving the pivot rods 32. Since the mirrors 16, 17 are disposed on the inside of the top 18 and front 19 surfaces, respectively, of the cabinet 20, the porper oreientation of the mirrors with respect to the television 12 is obtained by rotating the cabinet 20 with respect to the cradle 24.

As illustrated in FIG. 1, in the open, viewing position, the television is disposed at a predetermined angle $\alpha$ from the vertically disposed wall 26. The angle $\alpha$ controls the location of the virtual image with respect to the patient. Specifically, as the angle $\alpha$ is increased, the virtual image moves forwardly with respect to the patient (i.e., to the left in FIG. 1). Accordingly, an optimum viewing angle can be achieved for each patient by simply adjusting the angular orientation of the television. According to a preferred embodiment of the invention, however, the system is weight-balanced for the average size patient and includes appropriately located stops to provide two stable positions, corresponding to the open, viewing and closed, non-viewing positions, for the television 12 and the cabinet 20.

In the open, viewing position, the cabinet is disposed at an angle $\beta$ of 45° with respect to the television such that the first mirror 16 is disposed at an angle of 45° with respect to the output image from the screen. As noted above, the mirrors 16, 17 are disposed orthogonally with respect to one another. Therefore, the combined reflection is equivalent to viewing a virtual image 22 of the screen at a position symmetrically located from the screen on the opposite side of the corner 38 defined by the two mirrors 16, 17, as illustrated in FIG. 1.

Referring to FIGS. 1 through 3, the television system 10 is rotated from the open, viewing position to the closed, non-viewing position by first rotating the cabinet 20 counterclockwise about pivot rods 32 such that the cabinet is parallel to the television 12. Thereafter, the cradle 28, supporting the television 12 and cabinet 20, is rotated clockwise about pivot 30 such that the cabinet abuts against the wall in a compact manner, as illustrated in FIG. 3. Accordingly, the television can be quickly and easily rotated from the open viewing position to the closed, non-viewing position.

According to the preferred embodiment of the invention, the reflective surface of each of the mirrors is disposed on the outside surface thereof, rather than on the inside surface, in order to eliminate a ghost image from being transmitted. Additionally, as illustrated in FIG. 1, a reading light 40 is secured to the end of the bracket 24 to allow the patient to read while comfortably lying in bed.

While the present invention has been described with respect to a television, it is of course understood that the invention could be utilized with any image-produced device.

I claim:

1. A bedside television device for a patient, comprising:
    a television mounted substantially above the head of the patient and having a screen on which an image is displayed, said screen facing substantially upwardly;
    means for reflecting said image displayed on said screen so as to create a virtual image of said image at a position above and forward of said patient at a distance that is further from said patient than said screen, said reflecting means including a pair of mirrors for successively reflecting said image; and
    a mounting means for mounting said television and said reflecting means in a room, said mounting means pivotally mounting said television and said mirrors so that said television and mirrors are rotatable from a first, non-viewing position to a second, viewing position.

2. The television device of claim 1 wherein said mirrors are disposed orthogonally with respect to one another.

3. The television device of claim 1 wherein said virtual image is located at a position symmetrically located from the screen on the opposite side of a corner, defined by the intersection of the planes of said mirrors, from the screen.

4. The television device of claim 1, further comprising a reading light secured to said mounting means for permitting said patient to read while lying in bed 5. The television device of claim 1 wherein said mounting means comprises:
    a support bracket secured to the wall and extending outwardly therefrom; and
    a cradle pivotally secured to said bracket, said television being secured to said cradle such that said television is pivotable from said first position to said second position by rotating said cradle.

6. The television device of claim 5 wherein said mounting means further comprises a cabinet for covering said television device, said cabinet being pivotally secured to said cradle and having said mirror disposed on inside surfaces thereof such that said mirrors are rotatable from said first position to said second position by rotating said cabinet.

7. A television device for use by a patient while lying in bed, comprising:
    a television having a screen on which an image is displayed;
    a pair of mirrors disposed orthogonally with respect to one another for successively reflecting said image therefrom to create a virtual image located at a position symmetrically located from the screen on the opposite side of a corner defined by the intersection of the planes of said mirrors from the screen wherein when said television device is mounted in a room, said virtual image is located above and further from said patient than said screen; and
    mounting means for mounting said television and mirrors so that said television and said mirrors are rotatable from a viewing position to a non-viewing position.

8. The television device of claim 7, further comprising a cabinet for covering said television, said mirrors being mounted on inside surfaces of said cabinet.

* * * * *